(12) United States Patent  
May

(10) Patent No.: US 6,327,144 B1
(45) Date of Patent: Dec. 4, 2001

(54) COMPUTING DEVICE WITH IMPROVED HEAT DISSIPATION

(75) Inventor: Gregory J. May, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/468,612

(22) Filed: Dec. 21, 1999

(51) Int. Cl.[7] .................................................. G06F 1/20
(52) U.S. Cl. .................. 361/687; 361/695; 174/15.2; 165/104.33
(58) Field of Search ..................... 361/687, 699, 361/700, 695, 697, 683–686, 680, 704, 707; 174/15.2, 16.3; 165/80.1, 104.33, 104.21; 62/259.2

(56) References Cited

U.S. PATENT DOCUMENTS

| | | | |
|---|---|---|---|
| 5,207,579 | * | 5/1993 | Campagnuolo ............... 434/11 |
| 5,430,617 | * | 7/1995 | Hsu ................................ 361/818 |
| 5,454,471 | * | 10/1995 | Norvell .......................... 206/545 |
| 5,575,576 | * | 11/1996 | Roysden, Jr. ................. 400/472 |
| 5,625,532 | * | 4/1997 | Sellers .......................... 361/680 |

OTHER PUBLICATIONS

Ericsson at CeBIT'99, 3 pages, (published Mar. 18, 1999) http://www.ericsson.com/cebit/press/subpages/pr_r250.shtml.

Gore–Tex Immersion Technology Fabric, 1 page (copyright 1998–1999) http://www.gore.com/fabrics/allweather/immers.htm.

Immersion Technology Fabric, 2 pages (copyright 1995–1999) http://www.gore.com/fabrics/gorefabrics/html/5.html.

* cited by examiner

*Primary Examiner*—Leo P. Picard
*Assistant Examiner*—Hung Van Duong

(57) ABSTRACT

A computing device has a housing supporting multiple electronic components. The device housing has peripheral openings to facilitate the operation of internal components (cooling fan, audio speaker, etc.) and to facilitate coupling to external devices (second display, mouse pointing device, printer unit, etc.). To prevent liquids from entering into the housing, the openings are covered with a liquid-resistant, heat-permeable material, thereby creating a liquid-resistant barrier to prevent liquids from penetrating into the device's housing. Further, the liquid-resistant, heat-permeable material is breathable to allow heat dissipation from the electronic components.

53 Claims, 6 Drawing Sheets

COMPUTING DEVICE WITH IMPROVED HEAT DISSIPATION

TECHNICAL FIELD

This invention relates to computing devices, such as portable laptop computers.

BACKGROUND

Computing devices are widely utilized in a multitude of environments. Users rely on portable computing devices when traveling for business or leisure, further relying on their durability and continued operability in any number of environments.

Due to their portability, portable computing devices are designed to withstand both environmental variances and user abuse. Computing devices are expected to remain operable even when accidentally or intentionally introduced to a wet environment. A user may leave a computing device poolside where it may be subjected to water splashing, or alternatively, a user may spill a liquid drink onto and into the device.

Conventional computing devices employ rubber materials to protect the device's peripheral openings from accidental liquid saturation. While rubber materials can be utilized externally to seal the device's openings, or utilized internally to protect components from liquids, liquid-proof rubber materials do not allow for dissipating the heat generated by many of today's computing devices.

The electronics in a typical portable laptop computer can generate upwards of fifteen to sixty-five watts of power that must be dissipated from the computer's electronic housing. The amount of heat required to be dissipated continues to increase as technology advances and computer performance continues to increase.

Typically, a computing device's keyboard assembly is utilized to dissipate heat by allowing airflow out of the device's electronic housing through the keyboard and keyboard supporting structure. Keyboard assemblies are designed with many openings to accommodate assembling the key actuation mechanisms with the keyboard base plate and to permit heat dissipation. Unfortunately, these same openings also allow liquids to penetrate into a computer's electronic housing and onto the electronic components.

Accordingly, there is a need to improve the portability and durability of computing devices in varying environments by providing liquid protection of the device's electronic components without sacrificing the requirements of electronic component heat dissipation.

SUMMARY

This disclosure pertains to improving the liquid protection of computing devices while maintaining and/or improving the devices' electronic component heat dissipation requirements. A liquid-resistant, heat-permeable material is utilized to cover the peripheral openings in a computing device to reduce the likelihood of liquids entering the device's component housing and damaging the components or rendering the device inoperable. Additionally, the liquid-resistant, heat-permeable material may be utilized to wrap and enclose the device's electronic components in the event that liquids do find their way into the device's component housing.

In the described implementation, a computing device is embodied as a portable laptop computer having a housing with a lid and a base hingedly connected together. A display is mounted in the lid and a keyboard is mounted in the base. The housing also supports electronic components, including a processing component, power supply, battery, memory drive, modem, etc. The components are electronically interconnected to facilitate the operation of the computing device. The device housing has multiple peripheral openings to facilitate coupling to external devices, such as a second display, mouse pointing device, printer unit, etc., and to permit heat dissipation. To prevent liquids from entering the housing, the openings are covered with the liquid-resistant, heat-permeable material, thereby eliminating liquid penetration into the computing device's housing. The liquid-resistant, heat-permeable material is breathable to allow for electronic component heat dissipation.

BRIEF DESCRIPTION OF THE DRAWINGS

The same numbers are used throughout the drawings to reference like features and components.

DETAILED DESCRIPTION

Computing devices include many different types of mobile devices of varying sizes and designations, including portable computers, laptop computers, handheld computers, notebook computers, sub-notebook computers, palm-top computers, palm-sized computers, pocket computers, personal digital assistants, personal organizers, and the like. Although the context of this disclosure describes a portable laptop computer, the pertinent aspects are applicable to computing devices in general. This includes any computing device that may be located where it is desirable to protect against damage caused by the exposure to liquids, and the computing device having components that generate heat which must be dissipated.

Figure 1:
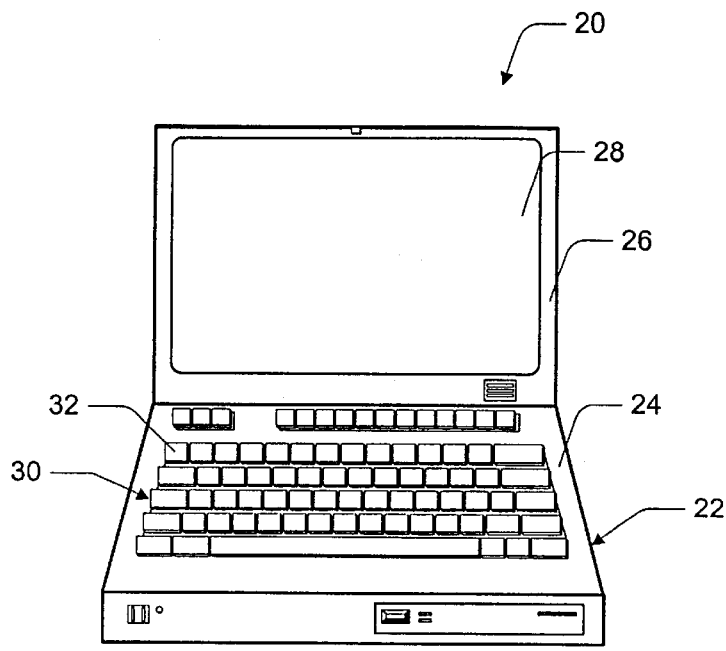
FIG. 1 is a perspective view of a computing device having a lid hingedly connected to a base.

FIG. 1 shows a computing device 20, embodied in the form of a laptop computer. The portable computer 20 has an external housing 22 formed of a housing base 24 and a housing lid 26. The housing base 24 and housing lid 26 are connected together via a hinge or other flexible joint (not shown) to permit the housing lid to fold down atop the housing base. A flat panel display 28 is mounted within the housing lid 26 and a keyboard assembly 30 is mounted within the housing base 24. The keyboard assembly 30 has individually operable input keys 32.

Figure 2:
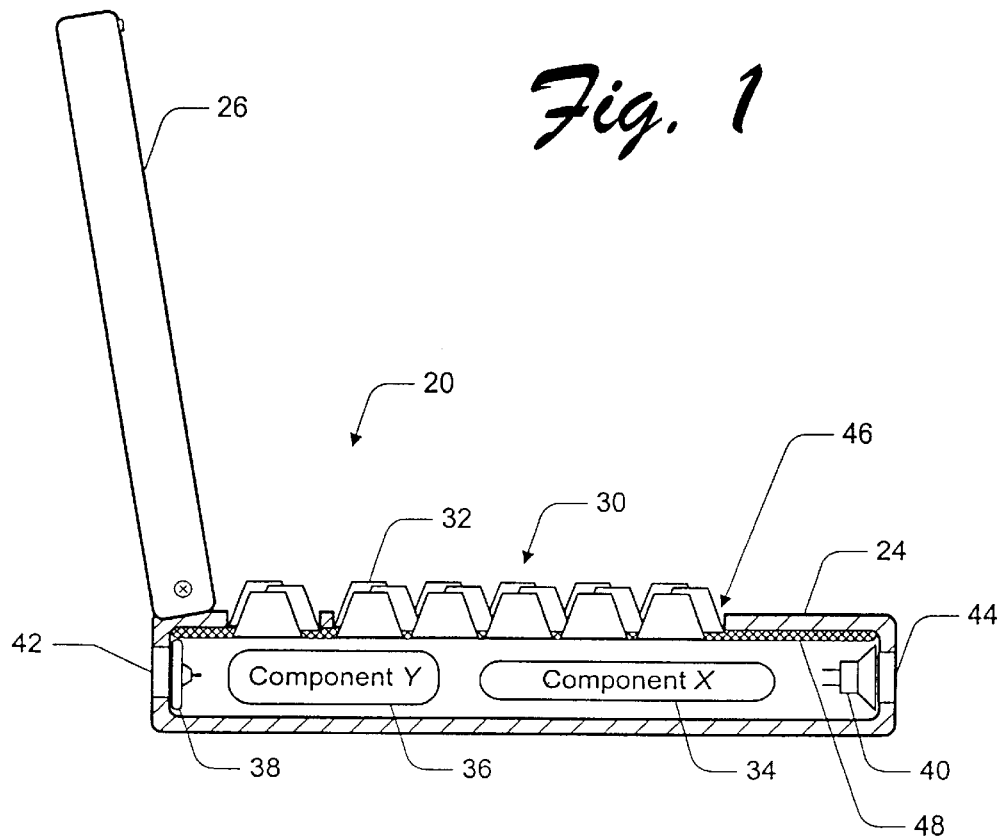
FIG. 2 is a cross-sectional side view as seen through the base of the computing device.

FIG. 2 shows the computing device 20 with a cross-sectional view of the housing base 24 to reveal aspects of the computer's internal construction and to illustrate the location of some of the device's possible electronic components. Examples of possible electronic components include a processing component, power supply, battery, hard drive, modem, other memory drives, etc. These components are electronically connected together in a conventional manner to facilitate operation of the computing device. For discussion purposes, the computer is illustrated as including an electronic component X and an electronic component Y, delineated as 34 and 36 respectively, an electronic cooling fan 38, and an audio speaker 40. The electronic components are mounted within the housing base 24.

The housing base 24 has device peripheral openings to enable coupling to external components, to facilitate the computer's component operation, and to allow the dissipation of heat generated by the computer's electronic components. Fan opening 42 facilitates operation of the electronic cooling fan 38, and audio speaker opening 44 facilitates operation of the audio speaker 40.

The audio speaker 40 is shown mounted flush against the audio speaker opening 44 on the inside of the housing base 24. In this configuration, sound from audio speaker 40 is emitted in a direction that is perpendicular, or otherwise orthogonal, with the audio speaker opening 44. Similarly, the electronic cooling fan 38 is shown mounted flush against the fan opening 42 on the inside of the housing base 24. In this configuration, airflow produced by electronic cooling fan 38 flows in a direction that is perpendicular, or otherwise orthogonal, with the fan opening 42.

FIG. 2 further depicts an input device opening 46 in the housing base 24 to accommodate the keyboard assembly 30. The input device opening 46 also allows heat dissipation from an interior of the housing base 24 to the exterior of the external housing 22. The heat generated by a typical computer's electronic components is dissipated through the many holes in the keyboard assembly structure and between and around the individually operable input keys 32 mounted on the keyboard assembly 30.

According to an aspect of this invention, a liquid-resistant, heat-permeable material 48 is installed within the housing base 24 to cover the input device opening 46. The liquid-resistant, heat-permeable material 48 allows both air and heat to flow through it while maintaining a barrier against liquids. Additionally, the liquid-resistant, heat-permeable material 48 is electrically non-conductive, acting as an electrical insulating barrier as well. The liquid-resistant, heat-permeable material 48 prevents liquid from entering the input device opening 46 while at the same time allowing heat to flow through the material to outside of external housing 22 so that the heat will be dissipated between and around the input keys 32 mounted on the keyboard assembly 30.

Figure 3:
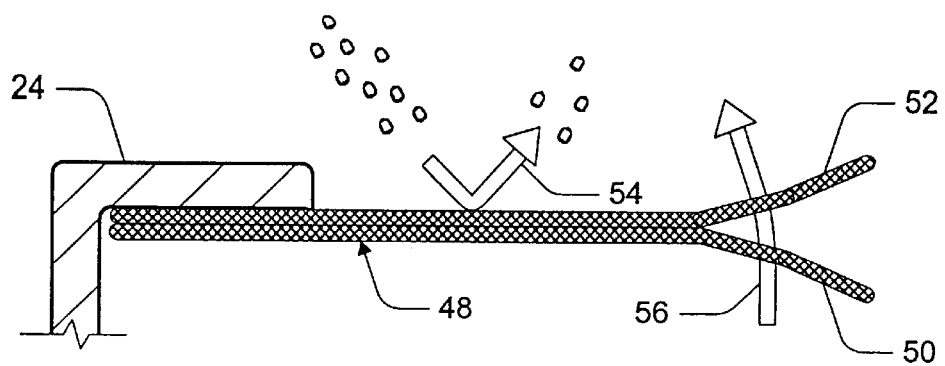
FIG. 3 illustrates the liquid-resistant, heat-permeable material.

FIG. 3 illustrates one exemplary implementation of the liquid-resistant, heat-permeable material 48 as having a breathable fabric 50, such as a metal screen, attached to a liquid-resistant fabric 52. Preferably, breathable fabric 50 is conductive to heat along the width and length of the fabric to dissipate heat across the surface of liquid-resistant fabric 52 to facilitate heat-permeability of the combined fabrics. First arrow 54 illustrates the liquid resistance of material 48 and second arrow 56 illustrates the heat dissipation from the inside of the housing base 24 to the exterior of the housing 22. Preferably, a single fabric is utilized to achieve the liquid-resistant, heat-permeable aspects of material 48. Alternatively, any number of fabrics with differing properties can be combined to achieve varying degrees of liquid resistance and heat permeability. One suitable material that is both liquid-resistant and breathable is GORE-TEX® IMMERSION® Technology Fabric manufactured by W. L. Gore & Associates.

Use of a liquid-resistant, heat-permeable material 48 is advantageous over computers using rubber-based materials, as well as other liquid-proofing sealants, because it permits the heat generated by a computing device's electronic components to be dissipated. Liquid-resistant, heat-permeable material 48 provides the advantage of liquid-resistant protection for a computing device's electronic components without sacrificing or impairing heat dissipation as is the case when using rubber-based materials.

A further advantage of using a liquid-resistant, heat-permeable material is that the number and size of openings in the housing 22 can be minimized for heat exhaustion from the housing 22. Peripheral openings in the housing 22 that are designed specifically for heat dissipation may no longer be required when the electronic components' generated heat can be dissipated through the existing device openings covered with the liquid-resistant, heat-permeable material 48. Thus, the computing device is further resistant to liquid penetration by reducing the number and size of openings in the housing 22.

Figure 4:
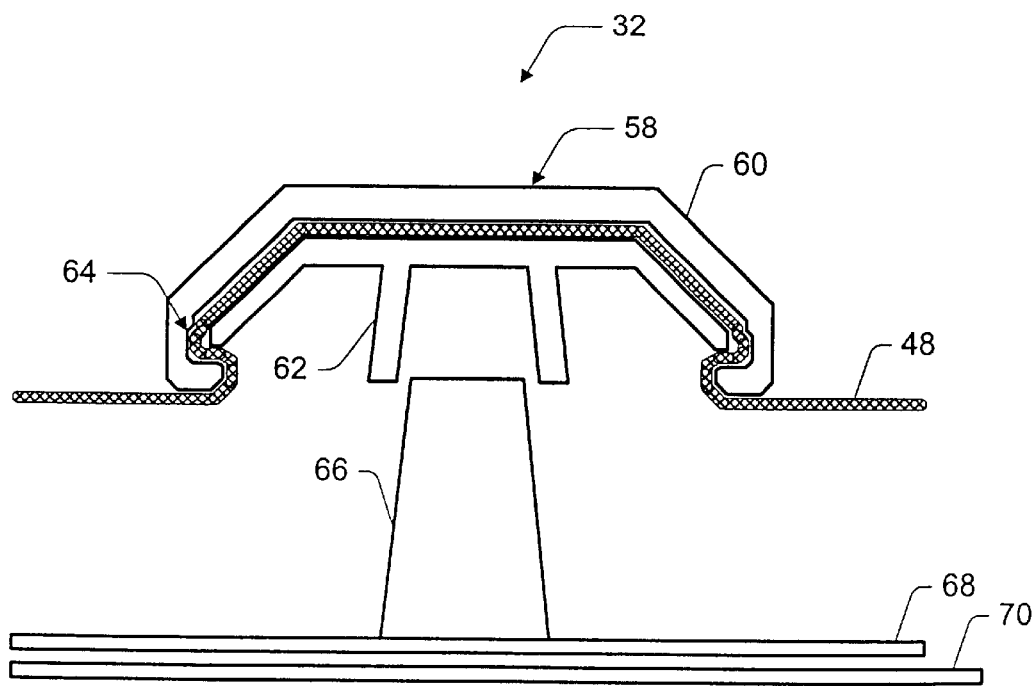
FIG. 4 illustrates a partial cross-sectional view of an input key and an installation location for the liquid-resistant, heat-permeable material.

FIG. 4 illustrates an input key 32 and one possible installation location of the liquid-resistant, heat-permeable material 48. Input key 32 has a keycap 58 formed from a keycap top piece 60 that snaps over, or otherwise engages, a keycap bottom piece 62. The figure depicts that keycap top piece 60 engages the keycap bottom piece 62 with detents 64 formed in the keycap top piece 60. Keycap 58 is held in place by an adhesive and/or by an engaging mechanism when installed on an input key electrical switch mechanism 66. The electrical switch mechanism 66 is typically a rubber cap and a carbon pad sealed to the keyboard assembly circuit board 68. When compressed, the electrical switch mechanism 66 activates traces on the circuit board thereby turning the switch on to indicate that an input key 32 has been depressed. When the input key 32 is released, the electrical switch mechanism 66 returns to its original state. For structural stability, a keyboard assembly backing plate 70 supports both the input key electrical switch mechanism 66 and the keyboard assembly circuit board 68.

In the illustrated implementation, the liquid-resistant, heat-permeable material 48 is installed so that it will be held in place between the keycap top piece 60 and the keycap bottom piece 62 when the two parts are engaged to form the keycap 58. There will not be any holes or openings in the liquid-resistant, heat-permeable material 48 when installed as one continuous piece between the keycap top piece 60 and the keycap bottom piece 62 of all of the input keys 32 making up the keyboard assembly 30. The input device opening 46, as well as all of the keyboard input key electrical switch mechanisms 66, will be completely covered and protected against damage caused by the exposure to liquids.

Installing the liquid-resistant, heat-permeable material 48 between the keycap top piece 60 and keycap bottom piece 62 allows the keyboard input keys' actuation to function in a manner that users are accustomed to and familiar with. Additionally, the liquid-resistant, heat-permeable material 48 can be pre-formed during manufacture to conform to the contours of the keycap top piece 60 and keycap bottom piece 62. Pre-forming the liquid-resistant, heat-permeable material 48 and installing it between the keycap pieces 60 and 62 to form an assembled unit prior to the computing device's assembly facilitates the manufacturing and assembly process of the finished computing device.

Manufacturing and pre-forming the liquid-resistant, heat-permeable material 48 prior to assembling the keyboard assembly 30 with the computing device would also allow printing the keycap nomenclature directly onto the liquid-resistant, heat-permeable material 48. Clear and non-distinctive keycap top pieces 60 could then be installed over the liquid-resistant, heat-permeable material 48 and engaged with the keycap bottom piece 62 to form the keycap 58. The keycap nomenclature would then be read through the clear keycap top pieces 60, thus protecting the nomenclature and the material 48 from a user's wear over time.

Alternate locations for installing the liquid-resistant, heat-permeable material 48 are evident to prevent liquid penetration into the housing base 24 via the keyboard assembly 30 and the input device opening 46 while at the same time allowing for heat dissipation from the interior of the housing base 24. The alternate locations for installing the liquid-resistant, heat-permeable material 48 provide similar advantages of liquid-resistant protection and heat dissipation.

Figure 5:
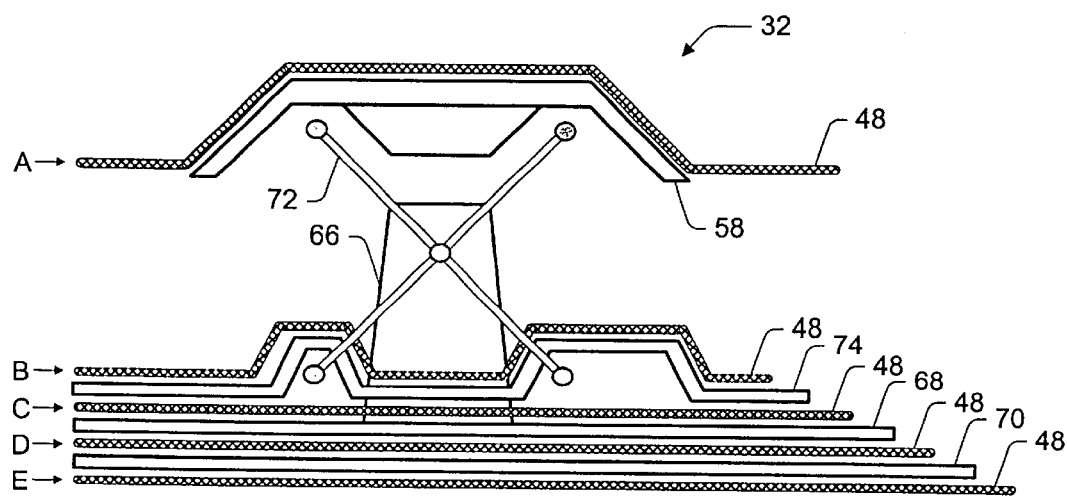
FIG. 5 is a partial cross-sectional view of an individual input key and illustrates alternate locations for installing the liquid-resistant, heat-permeable material within the keyboard assembly.

FIG. 5 illustrates alternate locations A through E for installing the liquid-resistant, heat-permeable material 48 within the keyboard assembly 30. Input key 32 has a one-piece keycap 58 that is held in place over the input key electrical switch mechanism 66 and above the alternate type of key actuating key-switch scissors 72.

Location A illustrates a clear liquid-resistant, heat-permeable material 48 installed to cover the entire keyboard assembly 30. In addition to the clear liquid-resistant, heat-permeable material 48 allowing a user to view through it, the clear liquid-resistant, heat-permeable material 48 can be pre-formed to emulate the look of a keyboard, printed with outlines detailing the input key locations and printed with the associated input key keycap nomenclature.

Location B illustrates the liquid-resistant, heat-permeable material 48 installed around the input key electrical switch mechanism 66 which is over the keyboard assembly framework 74, yet below the keycap 58. Location C illustrates the liquid-resistant, heat-permeable material 48 installed between the keyboard assembly framework 74 and the keyboard assembly circuit board 68. Location D illustrates the liquid-resistant, heat-permeable material 48 installed between the keyboard assembly circuit board 68 and the keyboard assembly backing plate 70. Location E illustrates the liquid-resistant, heat-permeable material 48 installed on the bottom of the keyboard assembly backing plate 70.

The aforementioned installation locations A through E for the liquid-resistant, heat-permeable material 48 offer differing degrees of liquid-protection, air flow, and heat dissipation by allowing for various hole sizes and locations to be designed into the keyboard components, the framework, the circuit board, and the backing plate. In all of the installation locations A through E, however, the liquid-resistant, heat-permeable material 48 covers the input device opening 46 to protect against damage to internal electronic components caused by an exposure to liquids.

Figure 6:
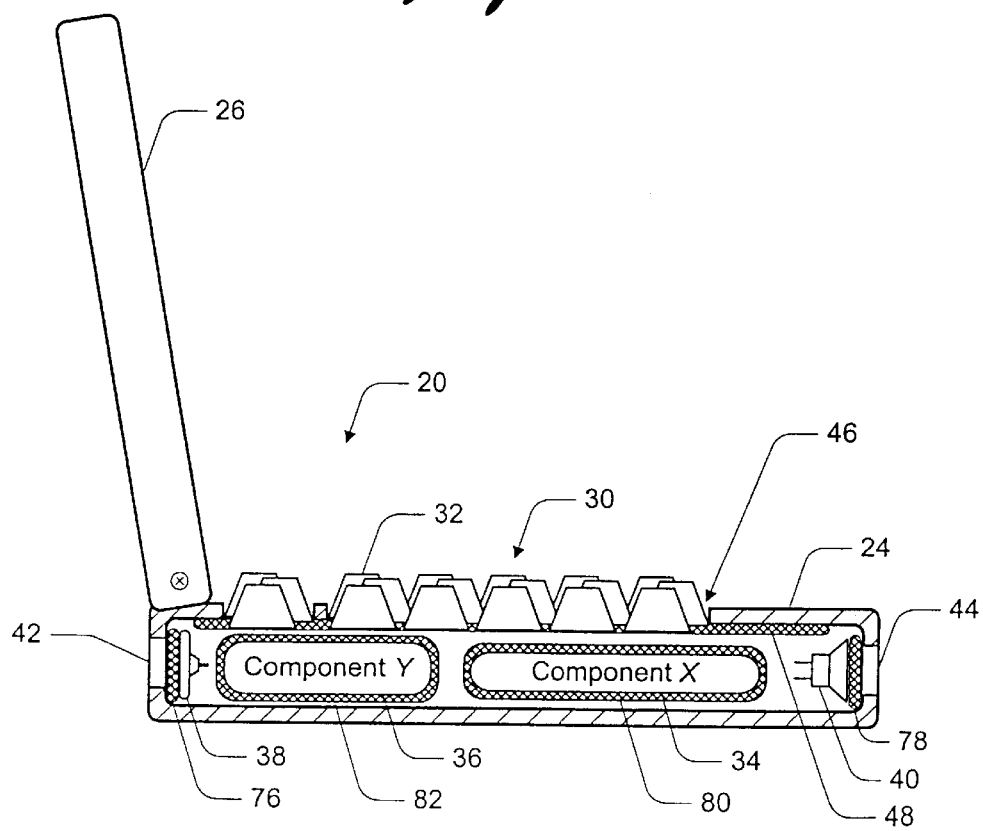
FIG. 6 is a cross-sectional side view as seen through the base of the computing device.

FIG. 6 illustrates utilizing the liquid-resistant, heat-permeable material to cover other device peripheral openings in the housing base 24. In the example, liquid-resistant, heat-permeable material 76 is installed within the housing base 24 to cover the fan opening 42. Liquid-resistant, heat-permeable material 78 is installed within the housing base 24 to cover the audio speaker opening 44. The liquid-resistant, heat permeable materials 76 and 78 prevent liquid from entering the device openings 42 and 44 respectively, while at the same time allowing heat to flow through the material so that it will be dissipated from the interior of the housing base 24 to the exterior of the housing 22. The liquid-resistant, heat permeable materials 76 and 78 are chosen separately to optimize either liquid-resistance or heat permeability depending on use. For example, the fan opening 42 is vertical, therefore, liquid-resistance properties may lessened to allow for more breathability of the fabric to allow for better airflow. Liquid-resistant, heat permeable material 48 might be optimized to provide for more liquid-resistance and less breatability of the fabric since the keyboard is horizontal and more susceptible to spills and the larger surface area allows for adequate heat dissipation.

A liquid-resistant, heat-permeable material is also able to be used as a wrap to enclose the electronic components mounted within the housing base 24. Liquid-resistant, heat-permeable material 80 is wrapped around the electronic component X, identified as item 34, and liquid-resistant, heat-permeable material 82 is wrapped around the electronic component Y, identified as item 36. Although FIG. 6 illustrates electronic components wrapped with the liquid-resistant, heat-permeable material in a two-dimensional cross-sectional view, it is to be understood that the liquid-resistant, heat-permeable material is wrapped around the electronic components such that the material completely encloses the components. The liquid-resistant, heat-permeable material 80 and 82 prevents liquid from encountering the electronic components 34 and 36 respectively, while at the same time allowing the heat generated by these electronic components to flow through the material so that it will be dissipated to the interior of the housing base 24.

Figure 7:
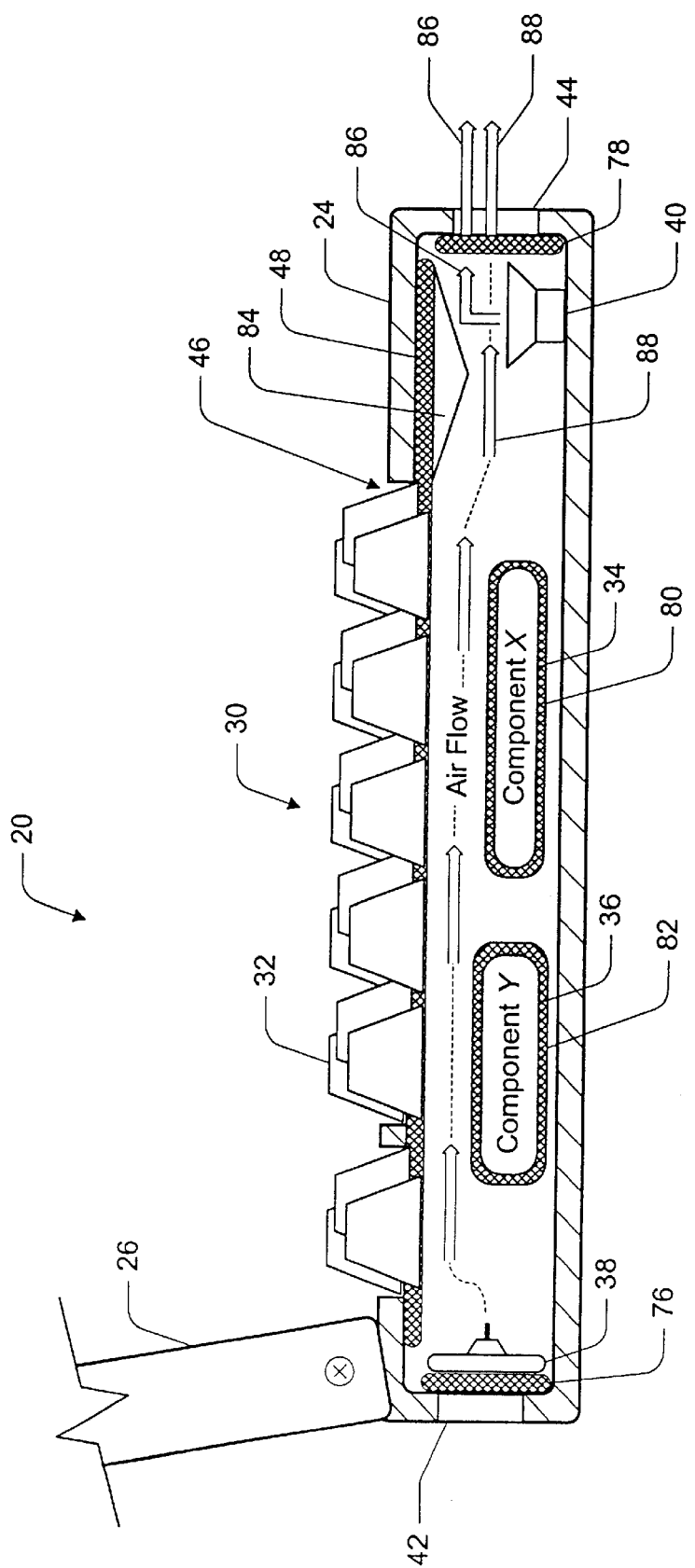
FIG. 7 is a partial cross-sectional side view as seen through the base of the computing device.

FIG. 7 shows an implementation in which the audio speaker 40 is mounted in an unconventional location inside of the housing base 24. In this configuration, sound from the audio speaker 40 is emitted in a first direction that is generally parallel, or at least not perpendicular to, the audio speaker opening 44. In practice, the sound emitted from the audio speaker 40 may be emitted in a first direction that is any direction orthogonal to the audio speaker opening 44.

A directional sound deflector 84 is mounted in the housing base 24 to direct the sound from the audio speaker 40 in a second direction toward the audio speaker opening 44. The deflected sound emitted from the audio speaker 40 is illustrated as sound arrow 86 and airflow within the interior of the housing base 24 is illustrated as airflow arrow(s) 88. As shown, the deflection of sound arrow 86 is in the same direction as the airflow arrow 88 within the interior of the housing base 24. The sound arrow 86 and the airflow arrow 88 are depicted as flowing from the interior of the housing base 24, through the liquid-resistant, heat-permeable material 78, and exiting to the exterior of the housing base 24 via the audio speaker opening 44.

It should be understood that FIG. 7 shows only one possible configuration of the electronic cooling fan 38, the audio speaker 40, the directional sound deflector 84, and the location of the device openings 42 and 44 within the housing base 24. Any number of configurations of the above-named components may be practiced to dissipate the heat from the interior of the housing base 24 to the exterior of the housing 22 while at the same time deflecting the sound arrow 86 to the exterior. Accordingly, any possible configuration of the components will allow the liquid-resistant, heat-permeable materials 76 and 78 to prevent liquid from entering the device openings 42 and 44 respectively.

Figure 8:
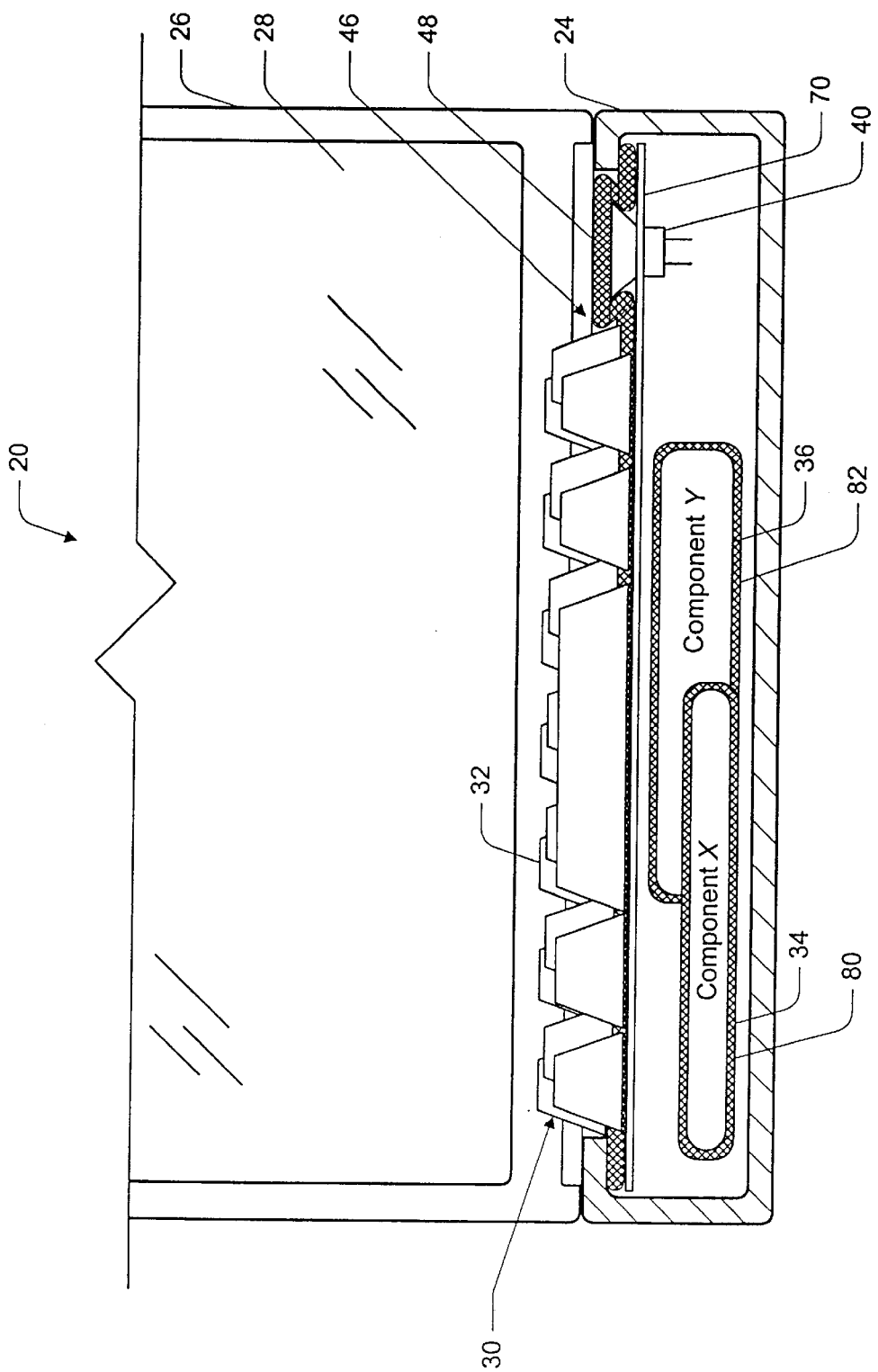
FIG. 8 is a partial cross-sectional front view as seen through the base of the computing device.

FIG. 8 shows an alternative implementation in which the keyboard assembly 30 is combined with the audio speaker 40 and the liquid-resistant, heat-permeable material 48 to form a liquid-resistant, heat dissipating keyboard speaker unit. The keyboard assembly backing plate 70 is illustrated as supporting the combination of the keyboard assembly 30 and the audio speaker 40. The liquid-resistant, heat-permeable material 48 is shown covering the input device opening 46 to form the liquid-resistant barrier, yet still allowing air, heat, and sound to flow from the interior of the housing base 24 to the exterior of the housing 22. Alternatively, the entire keyboard speaker unit could be enclosed with the liquid-resistant, heat-permeable material as a single component.

Assembling the keyboard components and an audio speaker with the liquid-resistant, heat-permeable material prior to manufacturing the computing device 20 facilitates the assembly process of the completed computing device. It should also be understood that FIG. 8 shows only one possible configuration of the audio speaker 40 combined with the keyboard assembly 30. Alternatively, the audio speaker 40 could be located to any side of the keyboard assembly 30, or even under the keyboard assembly 30. The audio speaker 40 can also be mounted in an unconventional manner and combined with a directional sound deflector 84 as discussed above in reference to FIG. 7. Any number of configurations are possible to form a keyboard speaker unit that will dissipate the heat from the interior of the housing base 24 to the exterior of the housing 22 while at the same time allowing sound to be emitted to the exterior.

Figure 9:
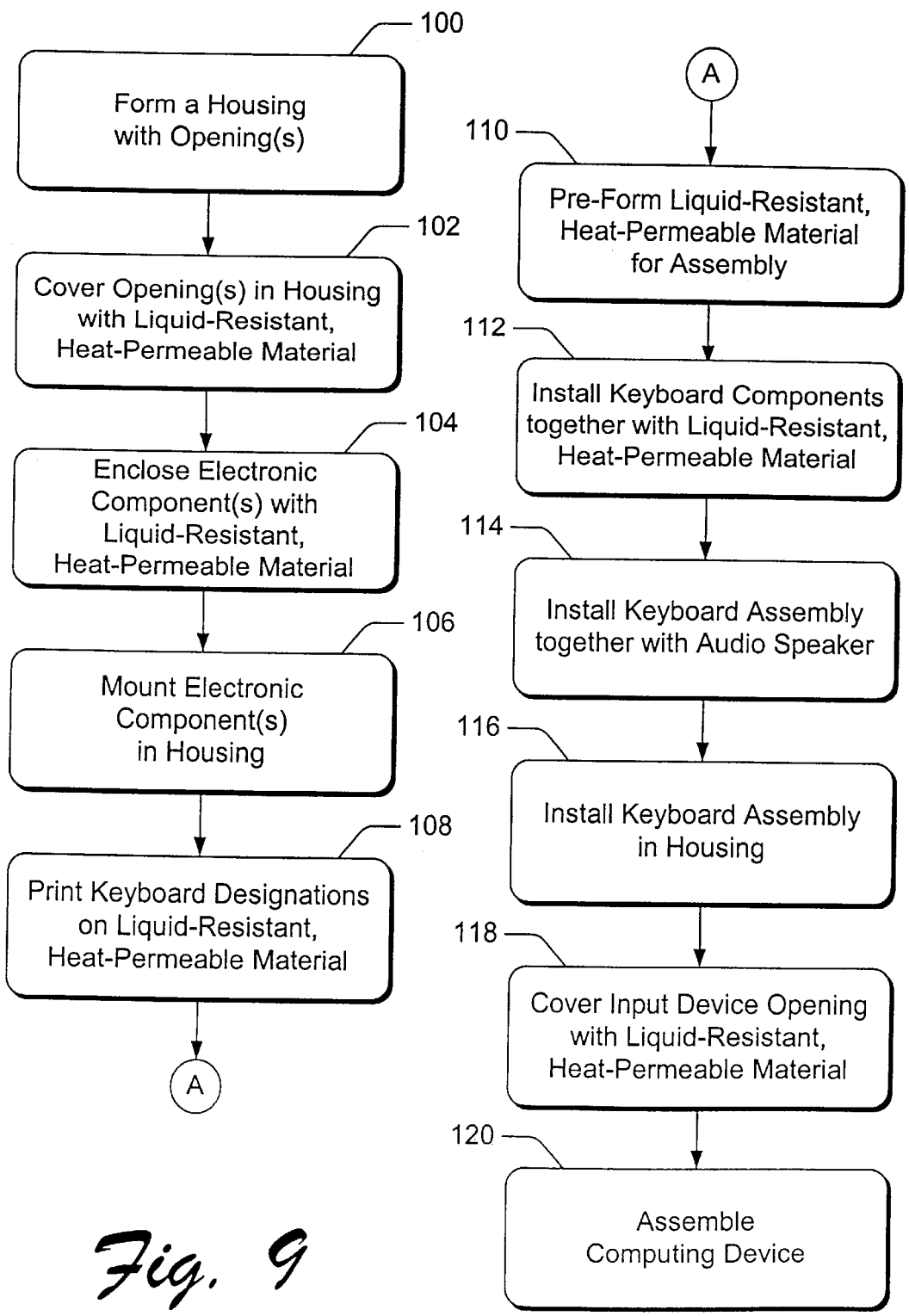
FIG. 9 is a flowchart showing a method for manufacturing a liquid-resistant, heat dissipating computing device.

FIG. 9 shows the method steps pertaining to manufacturing a liquid-resistant, heat dissipating computing device. At step 100, a computing device housing is formed with at least one opening. At step 102, the liquid-resistant, heat-permeable material is used to cover the opening(s) in the housing. At step 104, one or more electronic components are enclosed with the liquid-resistant, heat-permeable material and subsequently mounted within the housing at step 106.

At step 108, keyboard designations and input key keycap nomenclature are printed directly onto the liquid-resistant, heat-permeable material if the liquid-resistant, heat-permeable material will be utilized to cover the keyboard assembly. At step 110, the liquid-resistant, heat-permeable material is pre-formed to conform to the contours of the keyboard components, electronic components, and housing to facilitate the manufacture and assembly process of the computing device. At step 112, the liquid-resistant, heat-permeable material is installed over, within, or under the keyboard components to form a liquid-resistant, heat dissipating keyboard assembly.

At step 114, the keyboard assembly formed in step 112 is combined with an audio speaker such that the keyboard components, the audio speaker, and the liquid-resistant, heat-permeable material forms a liquid-resistant, heat dissipating keyboard speaker unit to further facilitate the manufacture and assembly process of the computing device.

At step 116, the pre-assembled liquid-resistant, heat dissipating keyboard assembly is installed within the housing. In conjunction with step 116, the liquid-resistant, heat-permeable material installed together with the keyboard components to form the keyboard assembly is installed within the housing to cover the input device peripheral opening at step 118. At step 120, the computing device is final assembled for use.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computing device comprising:

at least one electronic component;

a housing to mount the electronic component, the housing having at least one opening; and a liquid-resistant, heat-permeable material to cover the opening, the liquid-resistant, heat-permeable material preventing liquid from entering the opening while simultaneously allowing dissipation of heat generated by the electronic component from an interior of the housing to an exterior of the housing.

2. The computing device as recited in claim 1, wherein the opening accommodates an input device, further comprising:

an input device mounted in the opening in the housing; and the liquid-resistant, heat-permeable material covering the opening.

3. The computing device as recited in claim 1, wherein the opening accommodates a keyboard assembly, further comprising:

a keyboard assembly mounted in the opening in the housing; and a liquid-resistant, heat-permeable material covering the keyboard assembly and the opening.

4. The computing device as recited in claim 1, wherein the opening accommodates a keyboard assembly, further comprising:

a keyboard assembly mounted in the opening in the housing, the keyboard assembly having a framework; and the liquid-resistant, heat-permeable material being installed over the framework such that the liquid-resistant, heat-permeable material covers the framework and the opening while allowing air and heat to flow through and around the keyboard assembly.

5. The computing device as recited in claim 1, wherein the opening accommodates a keyboard assembly, further comprising:

a keyboard assembly mounted in the opening in the housing, the keyboard assembly having a framework and a circuit board; and the liquid-resistant, heat-permeable material being installed between the framework and the circuit board such that the liquid-resistant, heat-permeable material covers the circuit board and the opening while allowing air and heat to flow through and around the keyboard assembly.

6. The computing device as recited in claim 1, wherein the opening accommodates a keyboard assembly, further comprising:

a keyboard assembly mounted in the opening in the housing, the keyboard assembly having a circuit board and a backing plate; and the liquid-resistant, heat-permeable material being installed between the circuit board and the backing plate such that the liquid-resistant, heat-permeable material covers the backing plate and the opening while allowing air and heat to flow through and around the keyboard assembly.

7. The computing device as recited in claim 1, wherein the opening accommodates a keyboard assembly, further comprising:

a keyboard assembly mounted in the opening in the housing, the keyboard assembly having a backing plate; and the liquid-resistant, heat-permeable material being installed adjacent to the backing plate such that the liquid-resistant, heat-permeable material covers the opening while allowing air and heat to flow through and around the keyboard assembly.

8. The computing device as recited in claim 1, further comprising:
- a cooling fan mounted in the housing to facilitate air movement via the opening; and
- the liquid-resistant, heat-permeable material covering the opening such that the liquid-resistant, heat-permeable material permits airflow generated by the cooling fan to flow through the opening.

9. The computing device as recited in claim 1, wherein the liquid-resistant, heat-permeable material encloses the electronic component.

10. The computing device as recited in claim 1, wherein the liquid-resistant, heat-permeable material is a single fabric that is both liquid-resistant and heat-permeable.

11. The computing device as recited in claim 1, wherein the liquid-resistant, heat-permeable material comprises a breathable fabric attached to at least one liquid-resistant fabric.

12. The computing device as recited in claim 1, wherein the liquid-resistant, heat-permeable material is comprised of a plurality of fabrics attached together.

13. The computing device as recited in claim 3, wherein the liquid-resistant, heat-permeable material is printed to depict both input key locations and input key nomenclature.

14. The computing device as recited in claim 3, wherein the keyboard assembly has a plurality of individual keys, further comprising:
- an individual key having a keycap with a keycap top piece and a keycap bottom piece; and
- the liquid-resistant, heat-permeable material being held in place between the keycap top pieces and the keycap bottom pieces such that the liquid-resistant, heat-permeable material covers the keyboard assembly and the opening.

15. A computing device comprising:
- at least one electronic component;
- an audio speaker;
- a housing to mount the electronic component and the audio speaker, the housing having an audio speaker opening; and
- a liquid-resistant, heat-permeable material to cover the audio speaker opening; the liquid-resistant, heat-permeable material preventing liquid from entering the audio speaker opening while simultaneously allowing dissipation of heat generated by the electronic component from an interior of the housing to an exterior of the housing and further allowing sound to pass through the audio speaker opening.

16. The computing device as recited in claim 15, wherein the audio speaker is mounted in the housing such that the audio speaker emits sound in a direction that is orthogonal with the audio speaker opening.

17. The computing device as recited in claim 15, further comprising:
- a directional sound deflector mounted in the housing;
- the audio speaker emitting sound in a first direction; and
- the directional sound deflector directing the sound emitted from the audio speaker in a second direction toward the audio speaker opening.

18. The computing device as recited in claim 15, wherein the liquid-resistant, heat-permeable material is a single fabric that is both liquid-resistant and heat-permeable.

19. The computing device as recited in claim 15, wherein the liquid-resistant, heat-permeable material comprises a breathable fabric attached to at least one liquid-resistant fabric.

20. The computing device as recited in claim 15, wherein the liquid-resistant, heat-permeable material is comprised of a plurality of fabrics attached together.

21. A computing device, comprising:
- at least one electronic component;
- an audio speaker;
- a keyboard assembly;
- the keyboard assembly and the audio speaker assembled to form a keyboard-speaker unit;
- a housing to mount the electronic component and the keyboard-speaker unit, the housing having a keyboard-speaker unit opening; and
- a liquid-resistant, heat-permeable material to cover the keyboard-speaker unit opening; the liquid-resistant, heat-permeable material preventing liquid from entering the keyboard-speaker unit opening while simultaneously allowing dissipation of heat generated by the electronic component from an interior of the housing to an exterior of the housing and further allowing sound to pass through the keyboard-speaker unit opening.

22. The computing device as recited in claim 21, wherein the liquid-resistant, heat-permeable material encloses the keyboard-speaker unit.

23. The computing device as recited in claim 21, wherein the keyboard-speaker unit has a plurality of individual keys, further comprising:
- an individual key having a keycap with a keycap top piece and a keycap bottom piece; and
- the liquid-resistant, heat-permeable material being held in place between the keycap top pieces and the keycap bottom pieces such that the liquid-resistant, heat-permeable material covers the keyboard-speaker unit and the keyboard-speaker unit opening.

24. A computing device comprising:
- at least one electronic component;
- an audio speaker;
- a cooling fan;
- a housing to mount the electronic component, the audio speaker, and the cooling fan, the housing having an audio speaker opening and a cooling fan opening; and
- a liquid-resistant, heat-permeable material to cover the audio speaker opening and the cooling fan opening; the liquid-resistant, heat-permeable material preventing liquid from entering the audio speaker opening and the cooling fan opening while simultaneously allowing dissipation of heat generated by the electronic component from an interior of the housing to an exterior of the housing and further allowing air to flow through the cooling fan opening and allowing both sound to pass through and air to flow through the audio speaker opening.

25. The computing device as recited in claim 24, further comprising:
- a directional sound deflector mounted in the housing;
- the audio speaker emitting sound in a first direction; and
- the directional sound deflector directing the sound emitted from the audio speaker in a second direction toward the audio speaker opening, wherein the deflection of sound in the second direction is in the same direction as the airflow in the interior of the housing.

26. The computing device as recited in claim 24, wherein the liquid-resistant, heat-permeable material is a single fabric that is both liquid-resistant and heat-permeable.

27. The computing device as recited in claim 24, wherein the liquid-resistant, heat-permeable material comprises a breathable fabric attached to at least one liquid-resistant fabric.

28. The computing device as recited in claim 24, wherein the liquid-resistant, heat-permeable material is comprised of a plurality of fabrics attached together.

29. The computing device as recited in claim 25, wherein the deflection of sound in the second direction is in a different direction as the airflow in the interior of the housing.

30. A method for producing a computing device, comprising:
    forming a housing with at least one opening;
    installing a liquid-resistant, heat-permeable material to cover the opening; and
    mounting at least one electronic component in the housing.

31. The method for producing a computing device as recited in claim 30, further comprising enclosing the electronic component with the liquid-resistant, heat-permeable material.

32. The method for producing a computing device as recited in claim 30, wherein the housing has an input device opening, further comprising:
    installing the liquid-resistant, heat-permeable material together with keyboard components to form a keyboard assembly; and
    installing the keyboard assembly within the housing.

33. The method for producing a computing device as recited in claim 31, further comprising pre-forming the liquid-resistant, heat-permeable material to conform to the contours of the electronic component.

34. The method for producing a computing device as recited in claim 32, further comprising printing keyboard designations on the liquid-resistant, heat-permeable material.

35. The method for producing a computing device as recited in claim 32, further comprising pre-forming the liquid-resistant, heat-permeable material to conform to the contours of the keyboard components.

36. The method for producing a computing device as recited in claim 32, wherein installing the liquid-resistant, heat-permeable material together with keyboard components comprises:
    placing the liquid-resistant, heat-permeable material on at least one keycap bottom piece; and
    installing a keycap top piece on said at least one keycap bottom piece wherein the liquid-resistant, heat permeable material is held in place between the at least one keycap bottom piece and the keycap top piece.

37. A method for producing a computing device, comprising:
    forming a housing with at least one opening;
    enclosing at least one electronic component with a liquid-resistant, heat-permeable material; and
    mounting the electronic component in the housing.

38. The method for producing a computing device as recited in claim 37, further comprising pre-forming the liquid-resistant, heat permeable material to conform to the contours of the electronic component.

39. A method for producing a computing device, comprising:
    forming a housing with at least one opening;
    combining a keyboard assembly and an audio speaker to form a keyboard-speaker unit;
    mounting the keyboard-speaker unit into the opening in the housing;
    installing a liquid-resistant, heat-permeable material to cover the opening; and
    mounting at least one electronic component in the housing.

40. The method for producing a computing device as recited in claim 39, further comprising enclosing the keyboard-speaker unit with the liquid-resistant, heat-permeable material.

41. The method for producing a computing device as recited in claim 39, further comprising installing the liquid-resistant, heat-permeable material together with the keyboard assembly and the audio speaker to form the keyboard-speaker unit.

42. The method for producing a computing device as recited in claim 41, further comprising printing keyboard designations on the liquid-resistant, heat-permeable material.

43. The method for producing a computing device as recited in claim 41, further comprising pre-forming the liquid-resistant, heat-permeable material to conform to the contours of the keyboard assembly.

44. A method for producing a computing device, comprising:
    forming a housing with at least one opening to dissipate heat generated within the housing,;
    installing a liquid-resistant heat-permeable material to cover the opening; and
    mounting at least one heat-generating component in the housing.

45. A method for producing, a computing device as recited in claim 44, further comprising pre-forming the liquid-resistant, heat-permeable material to conform to the contours of the housing and the opening.

46. A method for producing a computing device as recited in claim 44, further comprising:
    installing the liquid-resistant, heat-permeable material together with keyboard components to form a keyboard assembly; and
    installing the keyboard assembly within the opening in the housing.

47. A method for producing a computing device as recited in claim 44, further comprising:
    combining a keyboard assembly and an audio speaker to form a keyboard-speaker unit; and
    mounting the keyboard-speaker unit within the opening in the housing.

48. A method for producing a computing device as recited in claim 46, further comprising printing keyboard designations on the liquid-resistant, heat-permeable material.

49. A method for producing a computing device as recited in claim 46, further comprising pre-forming the liquid-resistant, heat-permeable material to conform to the contours of the keyboard components.

50. A method for producing a computing device as recited in claim 46, wherein installing the liquid-resistant, heat-permeable material together with keyboard components comprises:
    placing the liquid-resistant, heat-permeable material over at least one keycap bottom piece; and
    installing a keycap top piece over said at least one keycap bottom piece wherein the liquid-resistant, heat permeable material is held in place between the at least one keycap bottom piece and the keycap top piece.

51. The method for producing a computing device as recited in claim 47, further comprising enclosing the keyboard-speaker unit with the liquid-resistant, heat-permeable material.

52. The method for producing a computing device as recited in claim 47, further comprising installing the liquid-resistant, heat-permeable material together with the keyboard assembly and the audio speaker to form the keyboard-speaker unit.

53. The method for producing a computing device as recited in claim 47, further comprising pre-forming the liquid-resistant, heat-permeable material to conform to the contours of the keyboard-speaker unit.

* * * * *

UNITED STATES PATENT AND TRADEMARK OFFICE
CERTIFICATE OF CORRECTION

PATENT NO.     : 6,327,144 B1
DATED          : December 4, 2001
INVENTOR(S)    : May It is certified that error appears in the above-identified patent and that said Letters Patent is hereby corrected as shown below:

<u>Column 12,</u>
Line 31, delete "housing,;" and insert -- therefor -- housing; --
Line 32, after "liquid-resistant" insert -- , --

Signed and Sealed this

Sixteenth Day of September, 2003

JAMES E. ROGAN
*Director of the United States Patent and Trademark Office*